Oct. 21, 1969    S. M. TAYLOR    3,473,176
SEAT ARRANGEMENT FOR BOAT INTERIORS AND HINGE MEANS THEREFOR
Filed Feb. 16, 1968    2 Sheets-Sheet 1

INVENTOR.
STEPHEN M. TAYLOR
BY
Merchant & Gould
ATTORNEYS

Oct. 21, 1969  S. M. TAYLOR  3,473,176
SEAT ARRANGEMENT FOR BOAT INTERIORS AND HINGE MEANS THEREFOR
Filed Feb. 16, 1968  2 Sheets-Sheet 2
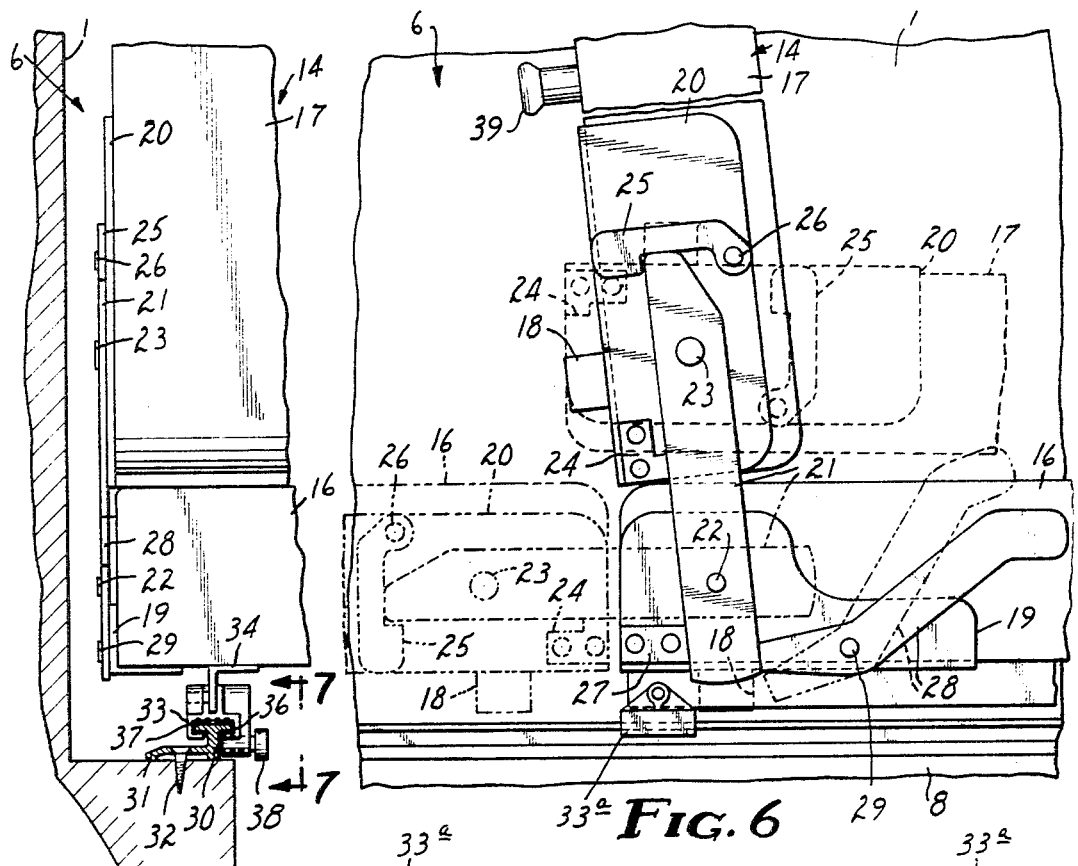
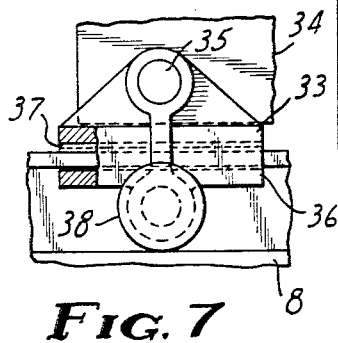
FIG. 5
FIG. 7
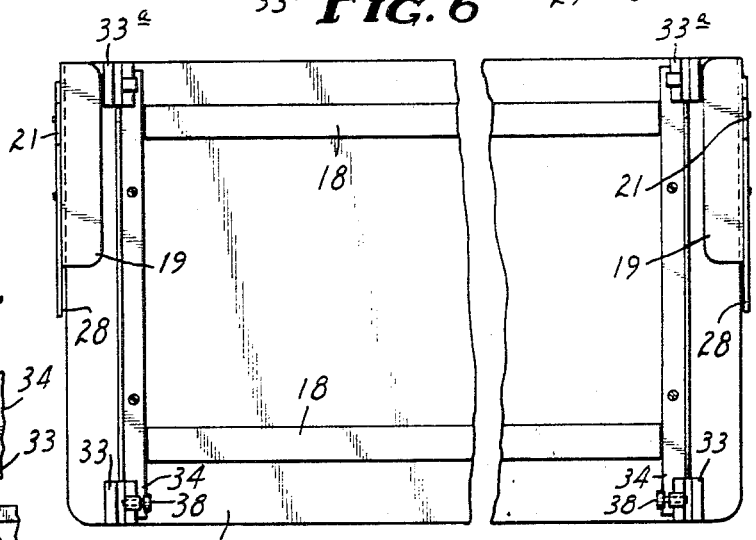
FIG. 6
FIG. 8
INVENTOR.
STEPHEN M. TAYLOR
BY
Merchant & Gould
ATTORNEYS

United States Patent Office 3,473,176
Patented Oct. 21, 1969

3,473,176
SEAT ARRANGEMENT FOR BOAT INTERIORS
AND HINGE MEANS THEREFOR
Stephen M. Taylor, 13 10th Ave. S.,
Hopkins, Minn. 55343
Filed Feb. 16, 1968, Ser. No. 705,994
Int. Cl. B60n 1/06, 1/08
U.S. Cl. 9—7                                    8 Claims

ABSTRACT OF THE DISCLOSURE

Seat structure for boats including a pair of seats at least one of which comprises a seat portion and a back portion, and hinge means pivotally mounting the back portion on the seat portion for movements from a generally upright position either to a position overlying the seat portion or to a position in edge-to-edge coplanar relationship with the seat portion. A pair of guide rails supports the movable seat for forward and rearward movement. This movement, coupled with the hinging of the seat back portion, provides for a plurality of optional seating, reclining and storage arrangements.

Background of the invention

Heretofore, attempts have been made to improve seating arrangements in boats, particularly in the cockpits of runabouts and similar boats, where space is confined. Permanently installed seats afford no flexibility of seating arrangement. Seats of the currently popular back-to-back type, have the disadvantage of facing some of the occupants rearwardly of the boat; and, while these seats can be manipulated to provide reclining areas, in order for one to move easily from the front facing seats to the back of the boat, these seats are usually of single seat width and spaced apart to provide an aisle, and the reclining areas are not of sufficient width for maximum lounging comfort. Moreover, these back-to-back seats do not provide for further flexibility of seating arrangement.

Summary of the invention

The primary object of this invention is the provision of a boat seat structure which can be quickly and easily shifted and manipulated to provide for several optional arrangements for seating, reclining or storage, whenever desired, and without the necessity of tools for changing from one arrangement to another. To this end, I provide at least a pair of seats having a seat portion and a back portion, and novel hinge means whereby the back portion of at least one of the seats may be moved from a generally upright position to a selected one of two optional positions, one wherein the back portion overlies the seat portion in face-to-face engagement therewith, and the other in which the back and seat portions are in generally horizontal edge-to-edge coplanar relationship. I further provide means for supporting said one of the seats for forward and rearward sliding movement and for releasably locking the seat in desired set portions of such movement.

Description of the drawings

FIG. 5 is an enlarged fragmentary section taken substantially on the line 5—5 of FIG. 1;

FIG. 6 is an enlarged fragmentary section taken substantially on the line 6—6 of FIG. 1;

FIG. 7 is a still further enlarged fragmentary view in side elevation, as seen from line 7—7 of FIG. 5, some parts being broken away and some parts being shown in section; and FIG. 8 is a fragmentary view in bottom plan of one of the seat portions of this invention.

Detailed description

Figure 1:
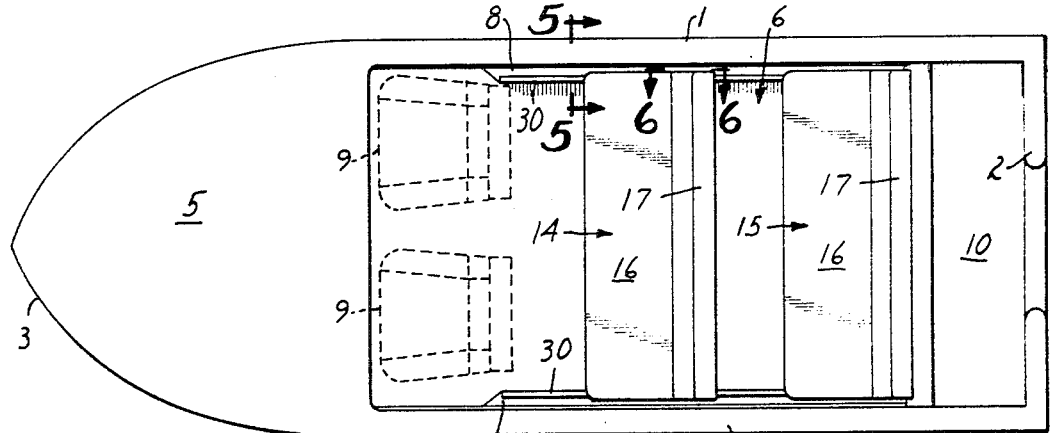
FIG. 1 is a view in top plan of a boat, showing the interior structure of this invention.
Figure 2:
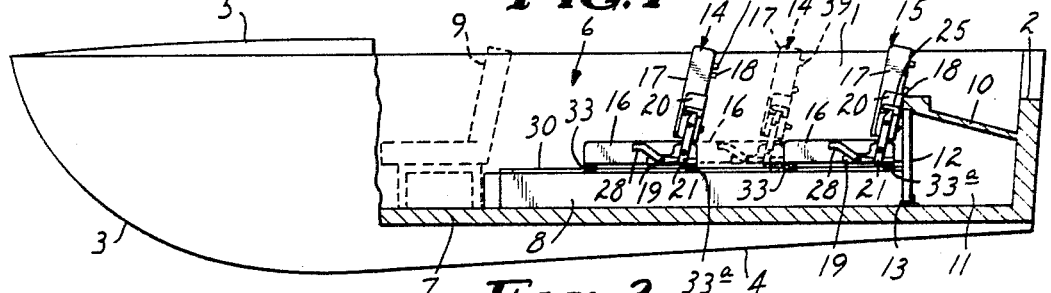
FIG. 2 is a view in side elevation, some parts being broken away and some parts being shown in section.

A boat hull of the runabout type is shown more or less diagrammatically as having opposite side walls 1 that extend forwardly from a transom 2 and converge to form a bow portion 3, a bottom portion 4, and a foredeck 5. The sidewalls 1, transom 2, and rear edge of the foredeck 5 cooperate to define an open cockpit 6 having a flat floor 7 and longitudinally or fore and aft extending generally horizontally ledges 8 which form a part of the side walls 1. A pair of fixed seats, shown by dotted lines, and indicated at 9, are permanently mounted in the cockpit 6 immediately behind the foredeck 5. A partition 10 extending between the sidewalls 1 and sloping forwardly and upwardly from the transom 2 provides a storage space 11 that is closed by a door 12 hinged to the floor 7, as indicated at 13.

In the embodiment of the invention illustrated, front and rear bench-type seats 14 and 15 respectively are mounted for forward and rearward sliding movement on the ledges 8, as will hereinafter be more fully described. The seats 14 and 15 are substantially identical, each including a seat portion 16 and padded and upholstered construction and which may be provided with cross brace members 18. Hinge means at opposite ends of the seats 14 and 15 mount the back portions 17 for swinging movements from generally upright positions overlapping the rear edge portions of their respective seat portion 16 to forwardly folded or rearwardly swung positions, selectively. In the forwardly folded positions of the back portions 17, the back portions overlie their respective seat portions 16 in face-to-face engagement, the seat 15 being shown thus folded in FIG. 4; whereas, in their rearwardly swung positions, the back portions 17 are disposed in substantially edge-to-edge abutting coplanar relationship with their respective seat portions 16, as shown by full lines in FIG. 3.

Each of the hinge means comprises a pair of brackets 19 and 20 rigidly secured to an adjacent end of a respective one of the seat and back portions 16 and 17, such as with screws or the like, and a rigid link 21 that is pivotally mounted at longitudinally spaced points on pins or studs 22 and 23 projecting laterally outwardly from the brackets 19 and 20 respectively, on parallel horizontal axes fixed relative to the link 21 and the respective brackets 19 and 20, see particularly FIGS. 5 and 6. Swinging movement of a back portion 17 in one direction relative to its link or links 21 is limited by a stop lug 24 on each of the brackets 20 and in the opposite direction by a latch hook 25 pivotally secured to the adjacent bracket 20, as indicated at 26, and engaging the adjacent end of the link 21. When the latch hook 25 is pivotally moved out of engagement with the link 21, the seat back portion 17 is free to be folded forwardly and downwardly into overlying face-to-face engagement with its respective seat portion 16, as shown in FIG. 4, and by dotted lines in FIG. 6. Swinging movement of each link 21 relative to its respective seat portion 16 is limited in one direction by a stop lug 27 on each bracket 19, and in the opposite direction by a release lever 28 pivotally mounted to each bracket 19, as indicated at 29. As shown by full lines in FIG. 6, the lower end of the link 21 is held against swinging movement in either direction by engagement of opposite side edges thereof by the stop lug 27 and lever 28. When the lever 28 is swung to its dot-and-dash line position of FIG. 6, the link 21 is free to swing in a direction to dispose its respective back portion 17 in coplanar relationship with its respective seat portion 16, as shown by dot-and-dash lines in FIG. 6, and by full lines in FIG. 3. When the back portion 17 is disposed in its generally upright position, the latch hook 25 and lever 28 cooperate with their respective stop lugs 24 and 27 to positively hold the link 21 against pivotal movement relative to both brackets 19 and 20, whereby to anchor the back portion 17 against swinging movement in either direction from its generally upright position. It will be appreciated that the hinge means at opposite ends of each seat 14 and 15 includes the stop lugs 24 and 27, a latch hook 25 and a latch lever 28, so that the back portions 17 are adequately supported at both ends. It will be further noted that the seat and back portions, being upholstered or padded, the lower edges of the back portions 17 may be disposed in overlapping engagement with their underlying seat portions 16, when the back portions 17 are in their generally upright positions, the padding of the seat and back portions being slightly compressed during swinging movements of the back portions 17.

A pair of seat supporting rails 30 are each disposed upon a different one of the boat ledges 8 and extend longitudinally thereof, each rail 30 having a laterally projecting longitudial flange 31 rigidly secured to its adjacent ledge 8 by a plurality of anchoring screws or the like 32, one of which is shown in FIG. 5. Each of the seat portions 16 is provided adjacent its opposite ends and at the forward and rearward edge portions thereof with pairs of slides 33 and 33a that are slidably mounted on an adjacent one of the rails 30, the slides 33 and 33a being secured to their respective seat portions 16 by angle brackets 34 secured to the seat portions 16 and secured to their respective slides 33 by pins, set screws or the like 35, see FIG. 7. As shown in FIG. 5, the rails 30 are cross-sectionally generally T-shaped, the upper portions of the rails 30 being disposed within opposed channel-forming portions 36 of the slides 33 and 33a, to hold the front and rear edge portions of the seat portions 16 against upward movement when a user leans backwardly against the back portions 17 or when the seats are being moved forwardly or rearwardly. The slides 33 and 33a are further provided with suitable bearing elements 37 that engage the top surfaces of the rails 30 for facilitating sliding movement of the seats forwardly and rearwardly of the boat. Each of the slides 33 has an anchoring screw 38 threaded therein for engagement with the adjacent rail 30 to releasably lock each slide 33 and its respective seat 14 and 15 against movement longitudinally of the boat. The back portions 17 are further provided with short legs 39 disposed to rest upon and slidably engage the rails 30, the legs 39 cooperating with the links 21 and latch hooks 25 to slidably support the back portions 17 thereon when the back portions 17 are swung rearwardly to their generally horizontal positions coplanar with their respective seat portions 16.

As shown in FIGS. 1–4, the above-described structure lends itself to several optional arrangements. A conventional seating arrangement is shown in FIG. 1 and by full lines in FIG. 2. This arrangement provides for a maximum seating capacity with all passengers facing forwardly of the boat. When the boat is loaded with fewer passengers, the forward seat 14 may be moved rearwardly to its position shown by dotted lines in FIG. 2, whereby the rear seat 15 and the back portion 17 of the forward seat 14 cooperate to define space for added storage, and the cockpit is enlarged between rearwardly moved forward seat 14 and the fixed seats 9.

Figure 3:
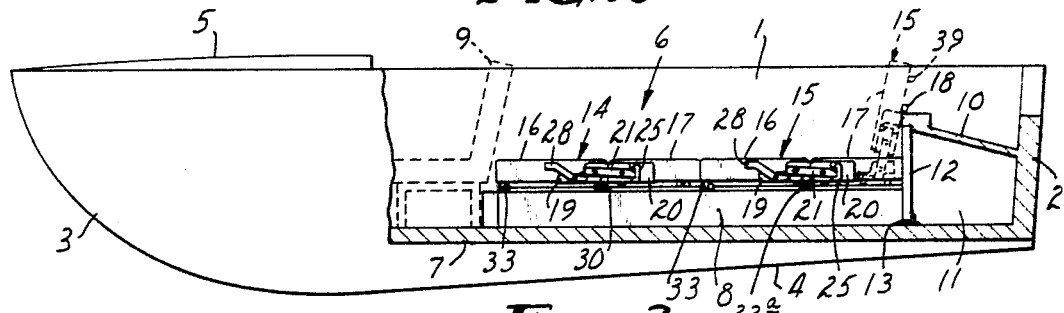
FIGS. 3 and 4 are views similar to FIG. 2, but showing different seat arrangements.
Figure 4:
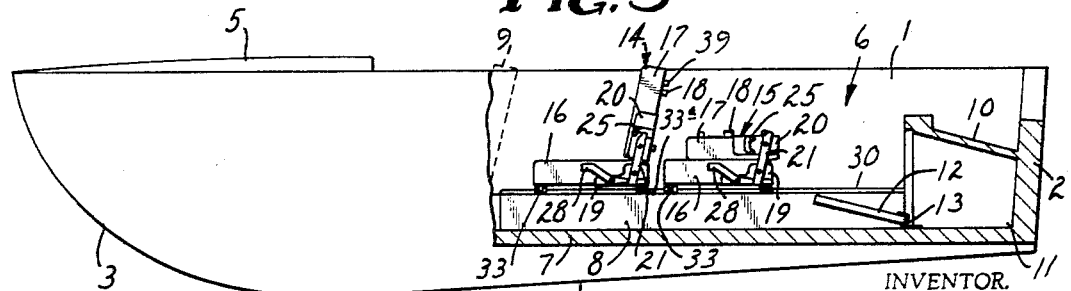

When the back portions 17 of both seats 14 and 15 are swung rearwardly and downwardly into coplanar relationship with their respective seat portions 16, both seats 14 and 15 cooperate to provide a full length bed, as shown by full lines in FIG. 3, whereon the occupants of the boat may lie above the level of the floor 7, for sun bathing or sleeping purposes. Thus, with a boat having a convertible top, this arrangement facilitates use of the boat for overnight or extended trips. By positioning the back portion 17 of the rear seat 15 in its generally upright position, as shown by full lines in FIG. 2, and dotted lines in FIG. 3, and by sliding the flattened-out forward seat 14 rearwardly into engagement with the seat portion 16 of the rear seat 15, a chaise lounge is quickly and easily provided.

As shown in FIG. 4, the back portion 17 of the rear seat 15 may be folded forwardly and into overlying engagement with its seat portions 16, and the rear seat 15 slid forwardly to provide easy access to an outboard motor, not shown, mounted on the transom 2, or to the storage compartment 11 through the door 12 thereof. The structure of the forward seat 14, being substantially identical to that of the seat 15, the back portion 17 of the seat 14 may also be forwardly folded over its respective seat portion 16, so that an occupant may easily step over the folded seat 14 to or from the rear seat 15. In this folded position, the seat 14 may be used as a table, or the occupants of the boat may sit on the same for trolling or casting for fish, if desired. The rear seat, when its back portion 17 is forwardly folded, may be used for the same purposes. It will be readily recognized that to use seats 14 and 15 as a seat in the folded position shown for seat 15 in FIG. 4, it would be desirable either to omit cross brace members 18 or, if necessary for support, to construct back portion 17 with cross brace member 18 internally disposed.

Although not specifically shown, the seating may be arranged with the back portion 17 of the seat 15 swung rearwardly into coplanar relationship with its cooperating seat portion 16 and disposed adjacent the door 12, as shown in FIG. 3; and the seat 14 slid rearwardly into engagement with the front edge of the seat portion 16 of the rear seat 15. This arrangement provides for a substantial cargo carrying space rearwardly of the forward seat 14. Further, the seats 14 and 15, being supported only on the rails 30, a substantial storage or cargo space is provided thereunder, no matter which optional seating arrangement is used at any given time.

The several hinge means, including the cooperating brackets 19 and 20 and their respective links 21, permit the lower edges of the back portions 17 to be disposed in overlapping engagement with the top surfaces of their respective seat portions 16 when the back portions are generally upright. Thus, the seat portions 16 may have a substantial fore and aft dimension to provide comfortable seating, the overlapping relationship of the back portions relative to the seat portions providing for ample knee room for occupants of the seats 14 and 15, when the seats are disposed as in FIGS. 1 and 2. With the fore and aft dimension of the seat portions obtained by the overlapping arrangement, a bed arrangement of substantial length may be obtained without the necessity of increasing the height of the back portions 17 to the extent that the appearance thereof, in their upright positions, is adversely affected.

While I have shown and described a boat interior structure in connection with a boat hull adapted to be driven by an outboard motor, the interior structure may be used with equal facility in the cockpit areas of boats having inboard motors with outboard drive units as well.

Further, although the preferred embodiment thereof utilizes a pair of full width bench-type seats both of which are movable in the manner and positions described, my invention will still be useful and desirable in other arrangements. For example, it might be desirable, because of space limitations, to have only one of the seats movable in the manner described. This movable seat might be either the front or back set. It might also be desirable, in a construction in which only one of the seats is movable, that the fixed seat, which might be either the front or back seat, comprise a pair of spaced apart single width seats rather than a full width bench-type seat.

What is claimed is:

1. Hinge means for a folding seat structure, said seat structure including a seat portion having front and rear edges and a normally generally upright back portion having normally upper and lower edges, the lower edge normally overlapping the seat portion adjacent its rear edge, said hinge means being arranged to permit swinging movement of said back portion in opposite directions from its normally generally upright position selectively, and comprising:

(a) a pair of hinge brackets arranged to be rigidly secured one to said back portion adjacent said lower edge thereof and the other to said seat portion adjacent the rear edge thereof;

(b) an elongated rigid hinge link;

(c) means pivotally mounting said link at longitudinally spaced points thereon to said brackets for pivotal movements of said link on parallel axes relative to each of said brackets independently of the other thereof; and (d) a pair of independent locking devices each operatively associated with a different one of said brackets and said link for releasably locking said link in a given position of its pivotal movement relative to each of said brackets individually, said locking devices comprising:

(1) a pair of fixed stop elements each on a different one of said brackets for positively limiting pivotal movement of said link in a given direction relative to each bracket;

(2) and a pair of locking members each pivotally mounted on a different one of said brackets and independently movable into engagement with said link to hold the link against a respective one of said stop elements, and against pivotal movement of the link in the opposite direction relative to each of said brackets.

2. The hinge means defined in claim 1, in which one of said locking members comprises a latch hook, the other of said locking members comprising a lever, said lever being pivotally mounted intermediate its ends to its respective bracket, said lever having one end portion engaging said link and an opposite end portion providing a handle.

3. A seat arrangement for boat interiors comprising:

(a) a pair of seats normally facing in the same direction and positioned one in front of the other, each seat having a seat portion and a back portion;

(b) a pair of generally horizontal rails each disposed adjacent an opposite side of the boat and extending longitudinally thereof in upwardly spaced relation to the floor of the boat, one of the seats having opposite end portions operatively slidably engaging said rails for forward and rearward movements relative to and independently of the other seat; and (c) hinge means mounting the back portion of said one of said seats on its respective seat portion for movements from a generally upright position selectively to a pair of generally horizontal positions in one of which the back portion overlies its respective seat portion and the other in which the back portion is disposed in edge-to-edge coplanar relation with its respective seat portion, whereby to provide a plurality of seating, reclining and storage positions.

4. The seat arrangement defined in claim 3, in further combination with lock means for releasably anchoring said seats to said rails in desired set positions of the seats longitudinally of said rails.

5. The seat arrangement defined in claim 3, in which said hinge means is disposed to position said back portion in overlapping relation to the top surface of said seat portion in the generally upright position of said back portion.

6. The seat arrangement defined in claim 3, in which both of said seats have opposite end portions operatively slidably engaging said rails, characterized by hinge means mounting the back portion of the other of said seats for movements relative to its respective seat portion in the manner of the back portion of said one of the seats.

7. A seat arrangement for boat interiors comprising:

(a) a pair of seats normally facing in the same direction and positioned one in front of the other, each seat having a seat portion and a back portion;

(b) support means mounting at least one of the seats for forward and rearward movements relative to and independently of the other seat;

(c) and hinge means mounting the back portion of said one of the seats on its respective seat portion for movements from a generally upright position selectively to a pair of generally horizontal positions in one of which the back portion overlies its respective seat portion and the other in which the back portion is disposed in edge to edge coplanar relation with its respective seat portion, whereby to provide a plurality of seating, reclining and storage positions, said hinge means comprising:

(1) a rigid link having opposite end portions operatively pivotally connected on parallel axes, one to said seat portion and the other to said back portion and arranged to dispose the back portion in face-to-face engagement with the seat portion in said overlying position, and in edge-to-edge substantially abutting relationship with said seat portion in said coplanar relationship therewith, said axes being fixed relative to their respective seat and back portions and to said link;

(2) and locking mechanism for releasably locking said back portion in its generally upright position.

8. Hinge means for a folding seat structure, said seat structure including a seat portion having front and rear edges and a normally generally upright back portion having normally upper and lower edges, the lower edge normally overlapping the seat portion adjacent its rear edge, said hinge means being arranged to permit swinging movement of said back portion in opposite directions from its normally generally upright position selectively, and comprising:

(a) a pair of hinge brackets arranged to be rigidly secured one to said back portion adjacent said lower edge thereof and the other to said seat portion adjacent the rear edge thereof;

(b) an elongated rigid hinge link;

(c) means pivotally mounting said link at longitudinally spaced points thereon to said brackets on parallel axes fixed on said link and brackets for pivotal movements of said link relative to each of said brackets independently of the other thereof; and (d) a pair of independent locking devices each operatively associated with a different one of said brackets and said link for releasably locking said link in a given position of its pivotal movement relative to each of said brackets individually.

References Cited

FOREIGN PATENTS

| | | |
|---|---|---|
| 496,961 | 11/1950 | Belgium. |
| 1,239,466 | 7/1960 | France. |
| 736,764 | 6/1966 | Canada. |

TRYGVE M. BLIX, Primary Examiner

U.S. Cl. X.R.

297—379